(12) United States Patent
Burdick et al.

(10) Patent No.: US 7,370,057 B2
(45) Date of Patent: May 6, 2008

(54) FRAMEWORK FOR EVALUATING DATA CLEANSING APPLICATIONS

(75) Inventors: Douglas R. Burdick, Ithaca, NY (US); Robert J. Szczerba, Endicott, NY (US); Joseph H. Visgitus, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 322 days.

(21) Appl. No.: 10/308,760

(22) Filed: Dec. 3, 2002

(65) Prior Publication Data

US 2004/0107202 A1    Jun. 3, 2004

(51) Int. Cl.
*G06F 17/30* (2006.01)

(52) U.S. Cl. .......................................... 707/102; 707/6
(58) Field of Classification Search ................... 707/4, 707/6, 104.1, 1, 10, 100, 102, 200; 714/715, 714/37, 41, 100; 715/764
See application file for complete search history.

(56) References Cited

U.S. PATENT DOCUMENTS

| | | | |
|---|---|---|---|
| 5,491,818 A | 2/1996 | Malatesta et al. | |
| 5,642,504 A | 6/1997 | Shiga | |
| 5,799,304 A | 8/1998 | Miller | |
| 5,819,291 A | 10/1998 | Haimowitz et al. | |
| 5,857,205 A | 1/1999 | Roth | |
| 6,263,308 B1 * | 7/2001 | Heckerman et al. | 704/231 |
| 6,865,582 B2 * | 3/2005 | Obradovic et al. | 707/104.1 |
| 6,876,966 B1 * | 4/2005 | Deng et al. | 704/233 |
| 6,978,275 B2 * | 12/2005 | Castellanos et al. | 707/102 |
| 7,020,804 B2 * | 3/2006 | Burdick et al. | 714/41 |
| 7,225,412 B2 * | 5/2007 | Burdick et al. | 715/764 |
| 2002/0133504 A1 * | 9/2002 | Vlahos et al. | 707/104.1 |

* cited by examiner

*Primary Examiner*—Don Wong
*Assistant Examiner*—Marc R Filipczyk
(74) *Attorney, Agent, or Firm*—Tarolli, Sundheim, Covell & Tummino LLP

(57) ABSTRACT

A system evaluates a first data cleansing application and a second data cleansing application. The system includes a test data generator, an application execution module, and a results reporting module. The test data generator creates a dirty set of sample data from a clean set of data. The application execution module cleanses the dirty set of sample data. The application execution module utilizes the first data cleansing application to cleanse the dirty set of sample data and create a first cleansed output. The application execution module further utilizes the second data cleansing application to cleanse the dirty set of sample data and create a second cleansed output. The results reporting module evaluates the first and second cleansed output. The results reporting module produces an output of scores and statistics for each of the first and second data cleansing applications.

17 Claims, 10 Drawing Sheets

| Problem | Dirty Data | Comments | Standardization/ Validation/ Correction can handle? |
|---|---|---|---|
| Missing value | Phone = 999-999999 | Unavailable entries during data entry (dummy values or null) | Maybe |
| Misspellings-Phonetic | Name ="Zerba" (should be 'Szczerba') | Usually results in very different strings. | No |
| Misspellings - Typographical | City="Oowego" City="Owgo" | Can be either insertion, deletion, transposition, or substitution of characters. Strings are still very similar. | Depends, If results in valid value, NO If results in non-sense, Yes |
| Wrong Word Order | partName1 = "Hammer No. 10" partName2 = "No. 10 Hammer" | Switch entire substring values - may be handled by standardization | Probably YES |
| Cryptic values, Unique Abbreviations | Occupation="DB Prog." Experience="B" | ad-hoc, proprietary standard. Usually not documented anywhere. | NO, if not documented |
| Common Abbreviations | St. for Street, Dr. for Doctor, etc. | These are widely accepted and used by many people. | YES |
| Acronym/Initials | PSU for Penn State Univ. D. B. for Doug Burdick | These are widely accepted acronyms ONLY | Acronyms, YES (if table) Initials, NO |
| Embedded Values | Name="J. Smith 12/2/70 New York" | Multiple values entered in for one attribute (in a free-form field) | YES |
| Misfielded values | City="United States" | No city by that name | YES |
| Violated attribute dependancies | City="Owego" Zip="14850" | City and zip code should | YES |
| Field (Word) Transpositions | Name1 = "J. Smith" Name2 = "Smith J." | Usually happens in free-form | YES -if identifiable |
| Duplicated Records | Emp1=(name="John Smith"...): Emp2=(name="J. Smith"...) | Same employee represented twice due to data entry errors | ABSOLUTELY NOT |
| Contradicting Records | Emp1=(name="John Smith" bdate="12/2/70") Emp2=(name="John Smith" bdate="12/12/70") | Same real-world entity described by two different values | NO |
| Wrong References | emp=(name="Doug Burdick", deptno=L49) | Referenced department (L49) is defined but wrong (should be L48) | NO |

Fig.1

```
Doctor Jim G. Taylor
5800 W, Elgin St.
Pittsburg, PA 15206
```

⇒

```
Pre-Name: Doctor
First Name: Jim
Middle Name:     G.
Last Name: Taylor
St. Range:    5800
Pre-Direction:    W.
Street Name:   Elgin
Suffix:           St.
City:       Pittsburg
State:           PA
Zip:          15206
```

Fig.2

```
Pre-Name: Doctor
First Name: Jim
Middle Name:     G.
Last Name: Taylor
St. Range: 5800
Pre-Direction:    W.
Street Name:   Elgin
Suffix:           St.
City:       Pittsburg
State:           PA
Zip:          15206
```

⇒

```
Pre-Name: Doctor
First Name: Jim
Middle Name:     G.
Last Name: Taylor
St. Range: 5800
Pre-Direction:    E.
Street Name:   Elgin
Suffix:           St.
City:      Pittsburgh
State:           PA
Zip:       15206-2331
```

Fig.3

```
Pre-Name:      Doctor
First Name:       Jim
Middle Name:       G.
Last Name:     Taylor
St. Range:       5800
Pre-Direction:      E.
Street Name:    Elgin
Suffix:            St.
City:       Pittsburgh
State:            PA
Zip:           15206
```

⇒

```
Pre-Name:         Dr.
First Name:     James
Middle Name:       G.
Last Name:     Taylor
St. Range:       5800
Pre-Direction:    East
Street Name:    Elgin
Suffix:         Street
City:       Pittsburgh
State:      Pennsylvania
Zip:        15206-2331
```

Fig.4

$$\text{Correctness Score} = \frac{w_1\left(\frac{\text{actual\_duplicates\_tossed}}{\text{orig\_duplicates\_records}}\right) + w_2\left(\frac{\text{actual\_unique\_left}}{\text{orig\_unique\_records}}\right) + w_2\left(\frac{\text{records\_correctly\_PCSed}}{\text{total\_records}}\right)}{(w_1 + w_2 + w_3)}$$

Fig.15

$$\text{Resource Usage Score} = \frac{w_4\left(\frac{\text{disk\_space\_used}}{\text{MAX\_DISK\_SPACE}}\right) + w_5\left(\frac{\text{execution\_time}}{\text{MAX\_EXECUTION\_TIME}}\right) + w_6\left(\frac{\text{memory\_used}}{\text{MAX\_MEMORY\_USED}}\right)}{(w_4 + w_5 + w_6)}$$

Fig.16

$$\text{Overall Score} = (w_q)(\text{Correctness\_score}) - (w_p)(\text{Resource\_usage\_score})$$

Fig.17

FRAMEWORK FOR EVALUATING DATA CLEANSING APPLICATIONS

FIELD OF THE INVENTION

The present invention relates to a system for cleansing data, and more particularly, to a system for evaluating data cleansing applications.

BACKGROUND OF THE INVENTION

In today's information age, data is the lifeblood of any company, large or small; federal, commercial, or industrial. Data is gathered from a variety of different sources in various formats, or conventions. Examples of data sources may be: customer mailing lists, call-center records, sales databases, etc. Each record from these data sources contains different pieces of information (in different formats) about the same entities (customers in the example case). Each record from these sources is either stored separately or integrated together to form a single repository (i.e., a data warehouse or a data mart). Storing this data and/or integrating it into a single source, such as a data warehouse, increases opportunities to use the burgeoning number of data-dependent tools and applications in such areas as data mining, decision support systems, enterprise resource planning (ERP), customer relationship management (CRM), etc.

The old adage "garbage in, garbage out" is directly applicable to this environment. The quality of the analysis performed by these tools suffers dramatically if the data analyzed contains redundant values, incorrect values, or inconsistent values. This "dirty" data may be the result of a number of different factors including, but certainly not limited to, the following: spelling errors (phonetic and typographical), missing data, formatting problems (incorrect field), inconsistent-field values (both sensible and non-sensible), out of range values, synonyms, and/or abbreviations (as illustrated in FIG. 1). Because of these errors, multiple database records may inadvertently be created in a single data source relating to the same entity or records may be created which don't seem to relate to any entity. These problems are aggravated when the data from multiple database systems is merged, as in building data warehouses and/or data marts. Properly combining records from different formats becomes an additional issue here. Before the data can be intelligently and efficiently used, the dirty data needs to be put into "good form" by cleansing it and removing these mistakes.

Thus, data cleansing necessarily involves the identifying of similarities between fields in different records. The simplest approach for determining which records have "similar" values for a particular field would be to define only identical values to be "similar". If two records have the same value for the field, they would be considered to have similar values. Otherwise, they would not. This approach is very prone to "noise," or errors present in the data causing differences between records describing the same object (i.e., causes records to have different values for the field).

Usually, the cleansing application output is evaluated by a human expert tracing through the result from the execution of the application on a given sample data set (where the correct answer is known). This interactivity is infeasible for all but the smallest record sets.

Many methods for evaluating the correctness of the application results solve this by only considering the number of records left in the cleansed output. Applications leaving a smaller number of records in the result are generally considered better, the idea being that these applications detected a higher number of duplicate records and eliminated them. The weakness of this measurement is that all discarded records are treated equally, whether they are actually duplicates (thrown out correctly) or were unique records (thrown out incorrectly). Additionally, measuring final record size alone fails to account for duplicate records being incorrectly left in the cleansed result.

This measurement rewards an application that aggressively merges records together (or has a low threshold for two records to be considered duplicates) and removes a large number of records. Duplicates incorrectly left increase the size of the final record set, while unique records incorrectly thrown out decrease the size. Thus, an application that makes the later type of error more frequently would be considered higher quality. Depending on the user application for which the data is being cleansed, incorrectly throwing out unique records may be much worse than leaving duplicate records in the final result.

Consider the example of a customer mailing list. A customer being represented by several records means that customer receives multiple copies of a catalog, which may be annoying. Completely removing all reference to the customer means that customer receives nothing, and that business could be completely lost.

Further, conventional measurements of cleansing applications totally separate correctness measurements from resource usage measurements (e.g., space used, execution time). Constraints on resources mean users usually are willing to make a tradeoff between quality and resources used. For example, a user with a deadline may choose to accept a result with more duplicates if the solution is arrived at quickly. There is no way to express this tradeoff if correctness and resource usage measurements are kept separate.

SUMMARY OF THE INVENTION

A system in accordance with the present invention provides a test-bed architecture for evaluating one or more data cleansing applications in parallel. Using virtual wrappers, the framework supports interoperability between individual components of different cleansing applications. This allows the creation of new "hybrid" solutions by combining pieces from several applications together. The wrappers also facilitate instrumentation for collecting information useful for evaluating application quality and performance.

Further, the system provides a mechanism for quantitatively evaluating, or "scoring," the performance of a cleansing application. The scores given are based on how well errors in the test data are detected and corrected, along with computing amount of resource usage (e.g., execution time, memory and disk space used) by the application.

The system runs the application with a generated "dirty" test database, for which the correct solution is known and measures the similarity of the cleansing application result to the correct solution. This similarity measurement is the basis for a correctness score. Additionally, the system further provides a way for integrating quality and computing resource usage data into a single measurement capturing the tradeoff between the two.

Conventional metrics for comparing competing cleansing applications are poorly defined and provide no consistent standards. Consider the example of a small store sending their mailing list database to a third party vendor to be cleansed. The vendor returns the data and indicates that 33% of the records were duplicates and removed. There is no direct way for the store owner (who may not be technically literate) to know if the correct records were removed or if duplicates remain. There is no direct way to determine how good of a cleansing job was done without a clearly defined set of performance metrics. Deriving such metrics is difficult or impossible in most conventional cases because there is no way to determine what the actual, correct answer is without including additional information, which is generally not available. For example, the only way to completely verify the correctness of a cleansed customer list is to attempt to contact every customer in the list (i.e., check that each record refers to a different customer and the contact information for him or her is valid). This is typically not feasible and/or prohibitively expensive for medium or large customer lists.

Depending on the type of data and its purpose, some types of errors in cleansed results are more acceptable than others are. For example, for a customer mailing list, leaving multiple records describing the same customer (i.e., duplicate records) results in mailing redundant sales literature to them, which may be annoying and wasteful. Removing all records referring to that customer means nothing is mailed to that customer, likely resulting in lost business. Since mailing nothing has a more severe result, the user would consider leaving a few extra duplicate records in the computed results more acceptable in this case. A similar scheme may be used for field level errors. For example, a first name error may be more acceptable than a zip code error.

Considerations such as these should be reflected in the correctness measures ("score") for the application. To support this, the correct answer should be known first to verify what the results from the application "should" look like.

Additionally, a user typically has a finite amount of computing resources (e.g., time, memory, extra disk space, etc.) and is willing to make a tradeoff between quality of answer and amount of resource usage. For example, if the user has a deadline and needs an answer quickly, the user may prefer an answer with a few more duplicates that is computed significantly faster. To capture this concept, the system combines resource usage metrics with correctness measurements for an overall evaluation of a cleansing application.

Also, most conventional data cleansing applications can be separated into the different pieces that perform the various steps of the cleansing process. It may be useful to evaluate a cleansing application at the level of these individual steps. Some applications may perform parts of the cleansing process better than others, and a better result may be obtained by combining the best pieces together from several applications thus creating a single "best of breed" solution, or hybrid data cleansing application.

BRIEF DESCRIPTION OF THE DRAWINGS

The foregoing and other advantages and features of the present invention will become readily apparent from the following description as taken in conjunction with the accompanying drawings, wherein:

FIG. 1 is a schematic representation of the performance of a part of an example system for use with the present invention;

FIG. 2 is a schematic representation of one example part of a system for use with the present invention;

FIG. 3 is a schematic representation of another example part of a system for use with the present invention;

FIG. 4 is a schematic representation of still another example part of a system for use with the present invention;

FIG. 15 is a schematic representation of yet another part of an example system in accordance with the present invention;

FIG. 16 is a schematic representation of still another part of an example system in accordance with the present invention; and FIG. 17 is a schematic representation of yet another part of an example system in accordance with the present invention.

DETAILED DESCRIPTION OF AN EXAMPLE EMBODIMENT

A system in accordance with the present invention provides a test bed architecture for supporting a framework that may evaluate a variety of data cleansing applications. Each component of a cleansing application may be instrumented, allowing for evaluation of individual application pieces (to the degree the application can be separated into components). Using virtual wrappers, the system may support easy integration of components from multiple cleansing applications, thus permitting the creation of a "best of breed", or hybrid, solution with the best components, taken from different applications incorporated together to form a new solution.

The system may evaluate the correctness of a cleansing application by using synthetic dirty test data generated from a clean data set. This system thus allows the quantitative evaluation of a cleansing application's correctness. Since the dirty test data was artificially generated, a priori knowledge of the location and type of all errors is available. Measuring how many errors the application failed to correct may easily be accomplished by comparing the application's answer for the test data set against the known correct answer.

The system may use these measurements for more sophisticated measurements of application correctness, thereby overcoming the problems associated with simply measuring the number of records in the cleansed output of the application. The system may utilize a scoring method for capturing the trade-offs often made between correctness and resource usage as well.

An example data cleansing system for use with the present invention identifies groups of records that have "similar" values in different records for the same field. "Similar" means that all of the records in the field set would have the same value if the data were free of errors. The example system may be robust to "noise" present in real-world data (despite best attempts at standardization, normalization, and correction). The example system may involve the application of sets of transform functions to the fields in each of the records. Additionally, the example system may create a data structure to store the similarity information of the associated records for each field.

Figure 6:
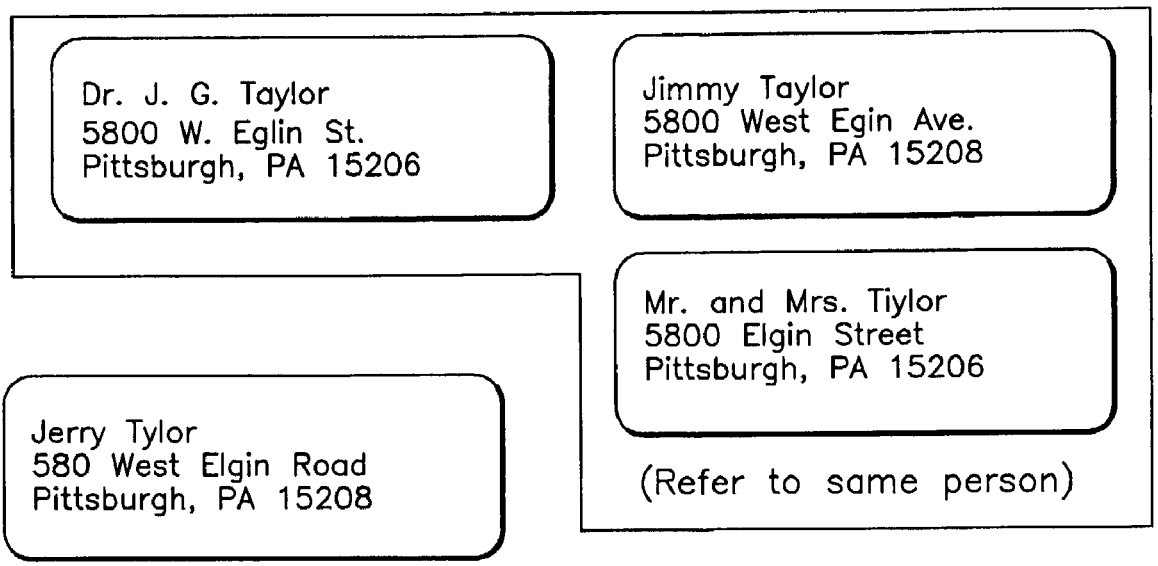
FIG. 6 is a schematic representation of still another example part of a system for use with the present invention.
Figure 7:
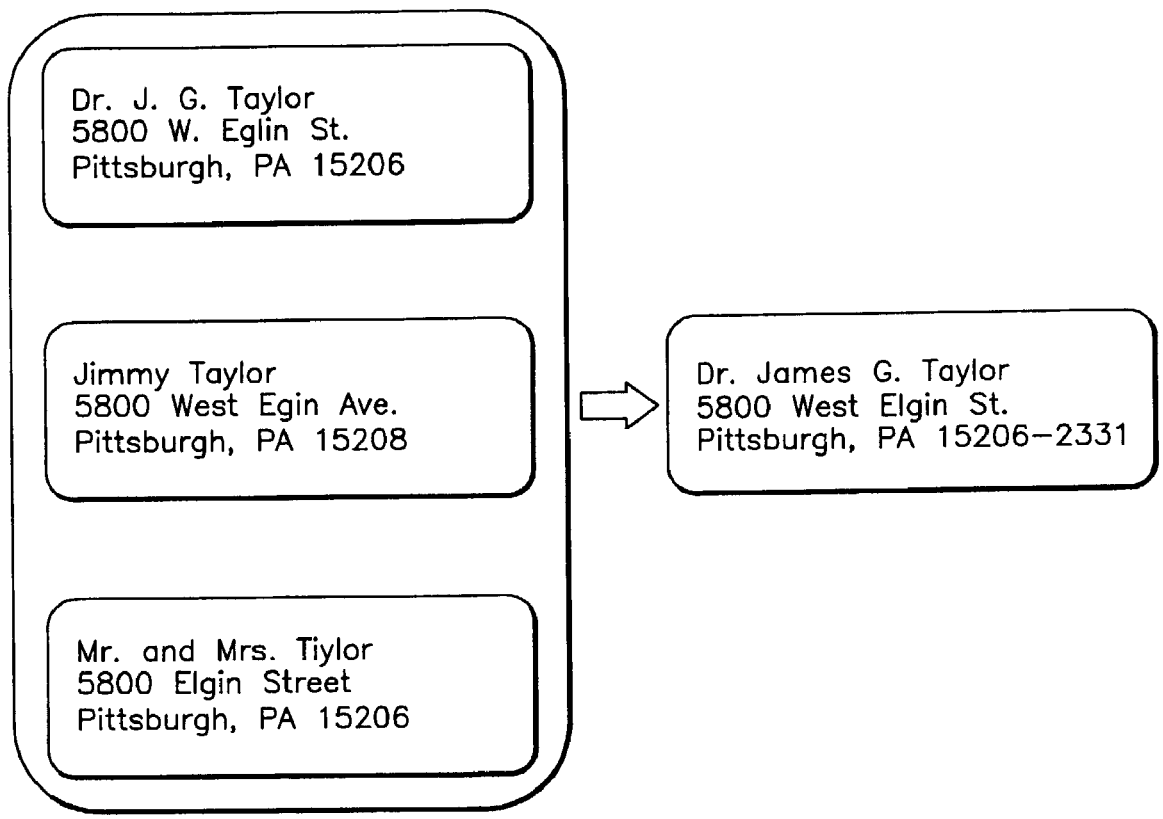
FIG. 7 is a schematic representation of yet another example part of a system for use with the present invention.

Typically, an example data cleansing process may be broken down into the following steps: parsing (FIG. 2); validation/correction (FIG. 3); standardization (FIG. 4); clustering (FIG. 5); matching (FIG. 6); and merging (FIG. 7). Note that different approaches may consolidate these steps or add additional ones, but the example system is essentially the same.

As viewed in FIG. 2, parsing may intelligently break a text string into the correct data fields. Typically, the data is not found in an easily readable format and a significant amount of decoding needs to be done to determine which piece of text corresponds to what particular data field. Note that this step does not involve error correction.

Records may be formatted or free-form. Formatted records have field values stored in a fixed order, and properly delineated. Free-form records have field values stored in any order, and it may be unclear where one field ends and another begins.

Once the string is parsed into the appropriate fields, the validation step, as viewed in FIG. 3, may check the field values for proper range and/or validity. Thus, a "truth" criteria must be provided as input to this step for each field.

The correction step may update the existing field value to reflect a specific truth value (i.e., correcting the spelling of "Pittsburgh" in FIG. 3). The correction step may use a recognized source of correct data such as a dictionary or a table of correct known values. For certain data, this step might not be feasible or appropriate and may be skipped.

As viewed in FIG. 4, the standardization step may arrange the data in a consistent manner and/or a preferred format in order for it to be compared against data from other sources. The preferred format for the data should be provided as input to this step.

Figure 5:
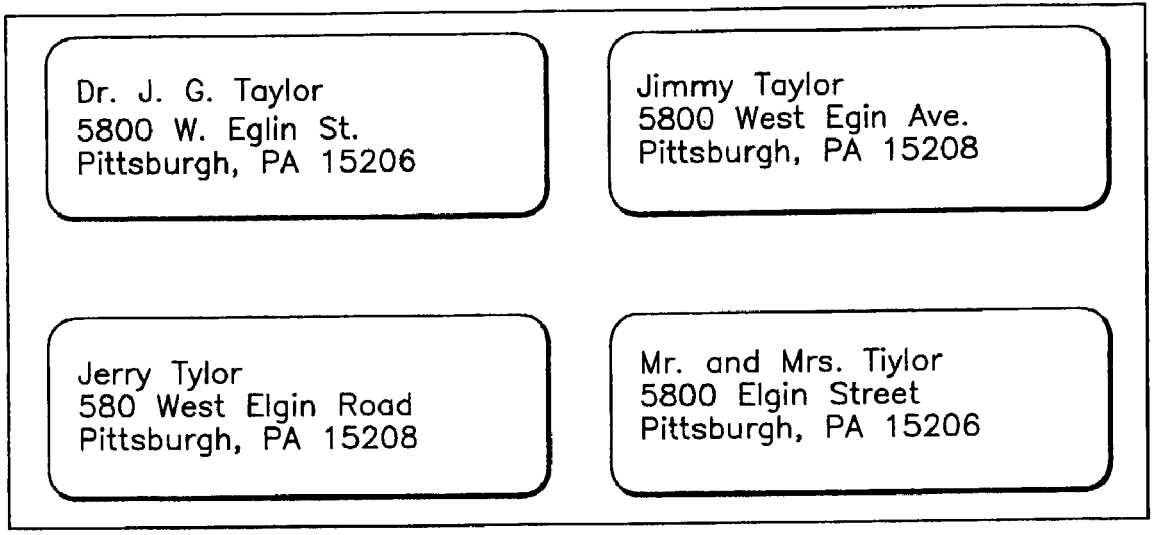
FIG. 5 is a schematic representation of yet another example part of a system for use with the present invention.

As viewed in FIG. 5, the clustering step may create groups of records likely to represent the same entity. Each group of records is termed a cluster. If constructed properly, each cluster contains all records in a database actually corresponding to a unique entity. A cluster may also contain some other records that correspond to other entities, but are similar enough to be considered. Preferably, the number of records in the cluster is very close to the number of records that actually correspond to the entity for which the cluster was built.

As viewed in FIG. 6, the matching step may identify the records in each cluster that actually refer to the same entity. The matching step searches the clusters with an application specific set of rules and utilizes a computational intensive search algorithm to match elements in a cluster to the unique entity. For example, the three indicated records in FIG. 6 likely correspond to the same person or entity, while the fourth record may be considered to have too many differences and likely represents a second person or entity.

As viewed in FIG. 7, the merging step may utilize information generated from the clustering and matching steps to combine multiple records into a unique (and preferably the most correct) view of each entity. The merging step may take data from fields of different records and "fuse" them into one, thereby providing the most accurate information available about the particular entity. The intelligent merging of several records into a single consolidated record ideally creates a new record that could replace the duplicate record cluster it was generated from without loss of any information.

In the clustering and matching steps, algorithms identify and remove duplicate or "garbage" records from the collection of records. Determining if two records are duplicates involves performing a similarity test that quantifies the similarity (i.e., a calculation of a similarity score) of two records. If the similarity score is greater than a certain threshold value, the records are considered duplicates.

Most data cleansing approaches limit the number of these "more intensive" comparisons to only the "most promising" record pairs, or pairs having the highest chance of producing a match. The reasoning is that "more intensive" comparisons of this type are generally very computationally expensive to perform. Many record pairs have no chance of being considered similar if compared (since the records may be very different in every field), thus the expensive comparison step was "wasted" if we simply compare every pair of records. The trade-off for not performing the "more intensive" inspection for every record pair is that some matches may be missed. For example, record pairs cannot have high enough similarity scores if the similarity score is never calculated.

For an example description of a system for use with the present invention, assume the data is given, including format of the data and type of data expected to be seen in each record field. The format and type information describes the way the data is conceptually modeled.

Each record contains information about a real-world entity. Each record can be divided into fields, each field describing an attribute of the entity. The format of each record includes information about the number of fields in the record and the order of the fields. The format also defines the type of data in each field (for example, whether the field contains a string, a number, date, etc.).

The clustering step may produce a set of records "possibly" describing the same real-world entity. This set ideally includes all records actually describing that entity and records that "appear to" describe the same entity, but on closer examination may not. This step is similar to a human expert identifying similar records with a quick pass through the data (i.e., a quick pass step).

The matching step may produce duplicate records, which are defined as records in the database actually describing the same real-world entity. This step is similar to a human expert identifying similar records with a careful pass through the data (i.e., a careful pass step).

The concepts of correctness using the terms "possibly describing" and "actually describing" refer to what a human expert would find if she/he examined the records. An example system for use with the present invention is an improvement in both accuracy and efficiency over a human operator.

If constructed properly, each cluster contains all records in a database actually corresponding to the single real-world entity as well as additional records that would not be considered duplicates, as identified by a human expert. These clusters are further processed to the final duplicate record list during the matching step. The clustering step preferably makes few assumptions about the success of the parsing, verification/correction, and standardization steps, but performs better if these steps have been conducted accurately. In the clustering step, it is initially assumed that each record potentially refers to a distinct real-world entity, so a cluster is built for each record.

Figure 8:
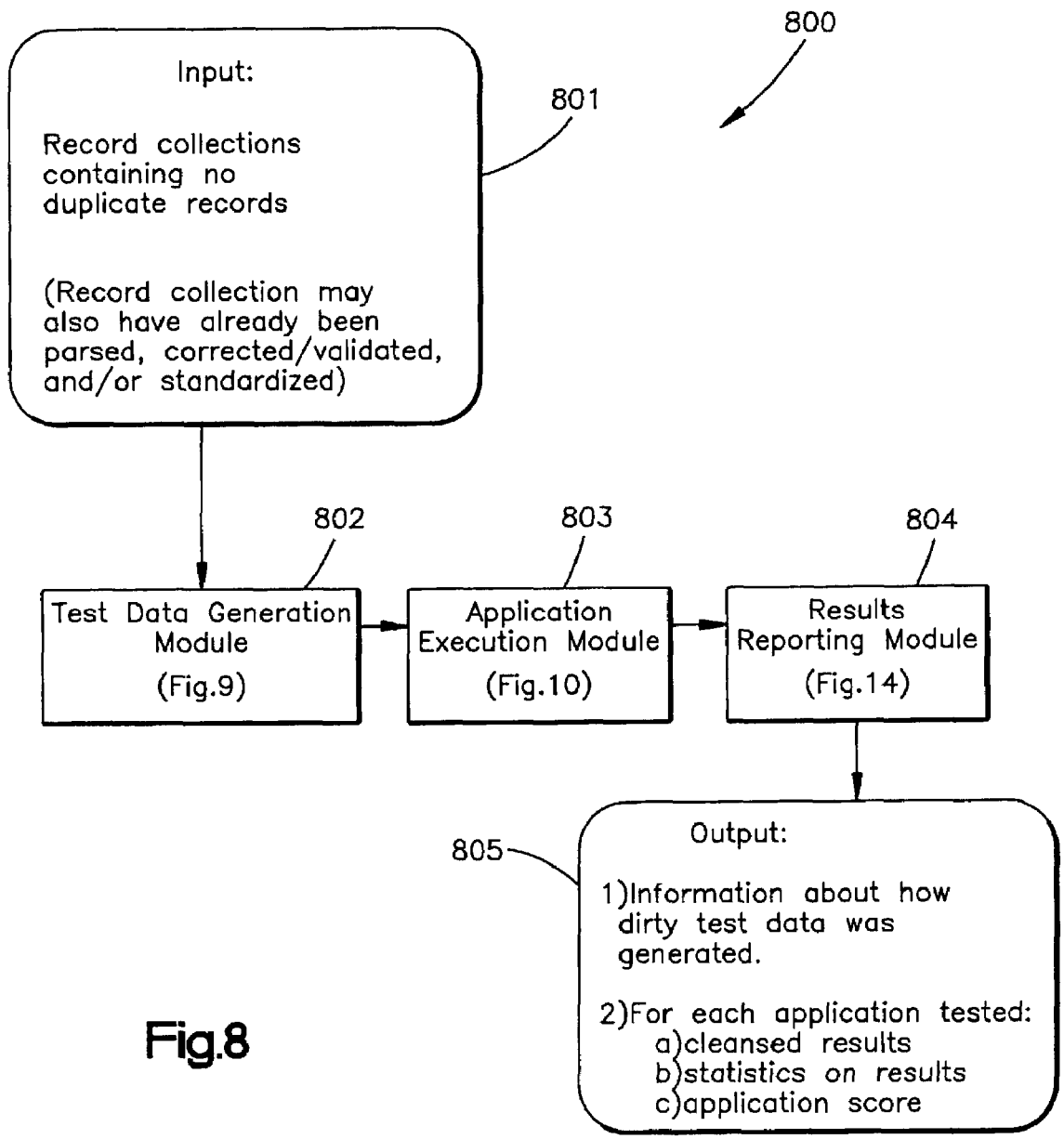
FIG. 8 is a schematic representation of part of an example system in accordance with the present invention.
Figure 14:
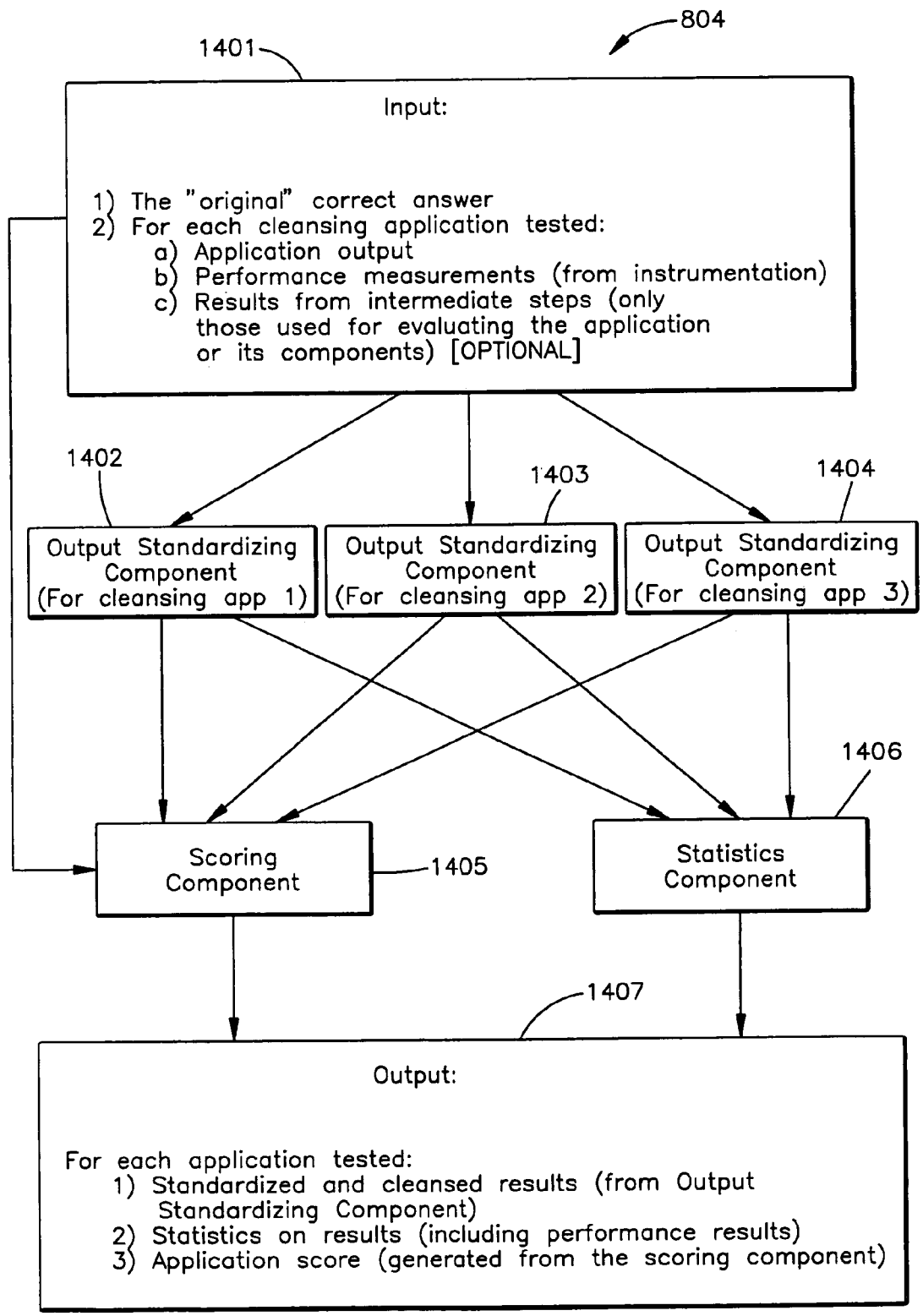
FIG. 14 is a schematic representation of still another part of an example system in accordance with the present invention.

A high level description of an example system 800 in accordance with the present invention for evaluating data cleansing applications is illustrated in FIG. 8. The input 801 to the system 800 is a sample set of clean records (i.e., all records are assumed to refer to a unique entity and all records preferably have been validated). This record set will serve as the "known correct" value or the standard against which the results of cleansing applications may be measured. The system 800 may be divided into 3 main components: a test data generation module 802 (FIG. 9); an application execution module 803 (FIG. 10); and a results reporting module 804 (FIG. 14).

The test data generation module 802 contains a test data generator used to create a dirty test sample. Additionally, this module 802 may format the dirty test data for each of the applications being tested.

The application execution module 803 executes the different cleansing applications being tested. Additionally, this module 803 may contain instrumentation providing visibility of the results of intermediate steps in the data cleansing applications. The input to this module 803 is the sample "dirty" test data for each application from the test data generation module 802, and the output would be the final cleansed results for each application and any tools needed for evaluating the application.

The results reporting module 804 presents the results to a user. The results are scored, and statistics are taken. The output 805 of the system 800 is an evaluation report for each cleansing application being tested. Specifically, the output may include cleansed results (in a common standardized format), statistics of the cleansed results, and "scores" quantifying how well the application cleansed the data (measuring quality of answer, resource usage, etc.)

Figure 9:
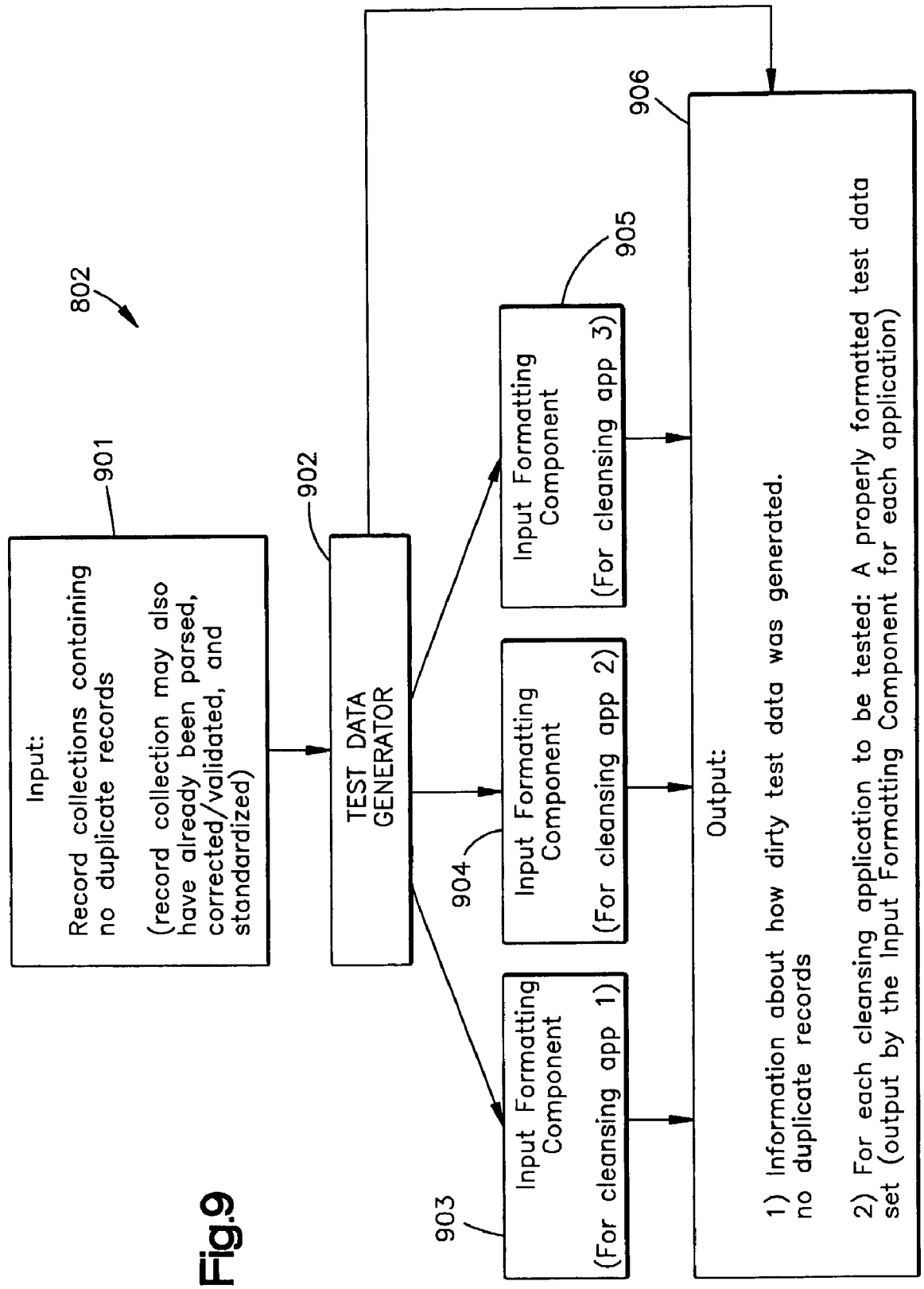
FIG. 9 is a schematic representation of another part of an example system in accordance with the present invention.

The test data generation module 802 creates the test "dirty" data used to evaluate the cleansing applications, as illustrated specifically in FIG. 9. The input 901 may be a known clean data set that was given to the system 800 (e.g., considered the "correct" answer). This clean record set will be used to generate a "dirty" test data set.

The quality of the output from each tested application will be measured by comparing the application answer to this "correct" answer, after processing the test data. There are numerous ways to create a clean data set for the input 901 to the test data generation module 802. Examples may include taking the results from another cleansing application or using a record sample already examined by a human expert. The actual correctness of the input 901 does not effect the veracity of the evaluation of the data cleansing applications conducted by the system 800.

The test data generator 902 generates a "dirty" test data set from the clean data set. There are numerous implementations for this test data generator 902. One example way of implementing the test data generator 902 may be as follows: one or more times, duplicate several of the records in the clean set; for each of these new duplicates, add errors ("dirtiness") to one or more fields of this new record; optionally, add errors to some of the original clean records; record information for the errors added in the two previous steps (e.g., error type, location, etc.) and assumptions made by the test data generator 902; and also add new duplicate records to the original clean record set.

The goal is the creation of a realistic "dirty" data sample by the test data generator 902 so the "dirtying" of the records mimics how errors would be introduced into real data. Ideally, all of the errors in the record set were added by the test data generator 902 to a presumed originally clean data set. Thus, the location and type of all errors is known. Given this information, it is straightforward to check what the application detected and what is missed by comparing the application output to the original correct answer.

The dirty test case is output by the test data generator 902 and then is then passed to the input formatting components 903, 904, 905 for each cleansing application being tested (three application are shown in FIG. 9, but any number are possible). The output 906 of each of these components 903, 904, 905 would be the formatted test cases for each application being tested. The overall output 906 for this module 802 is these outputs along with information about location and type of errors that were added by the test data generator 902.

Figure 10:
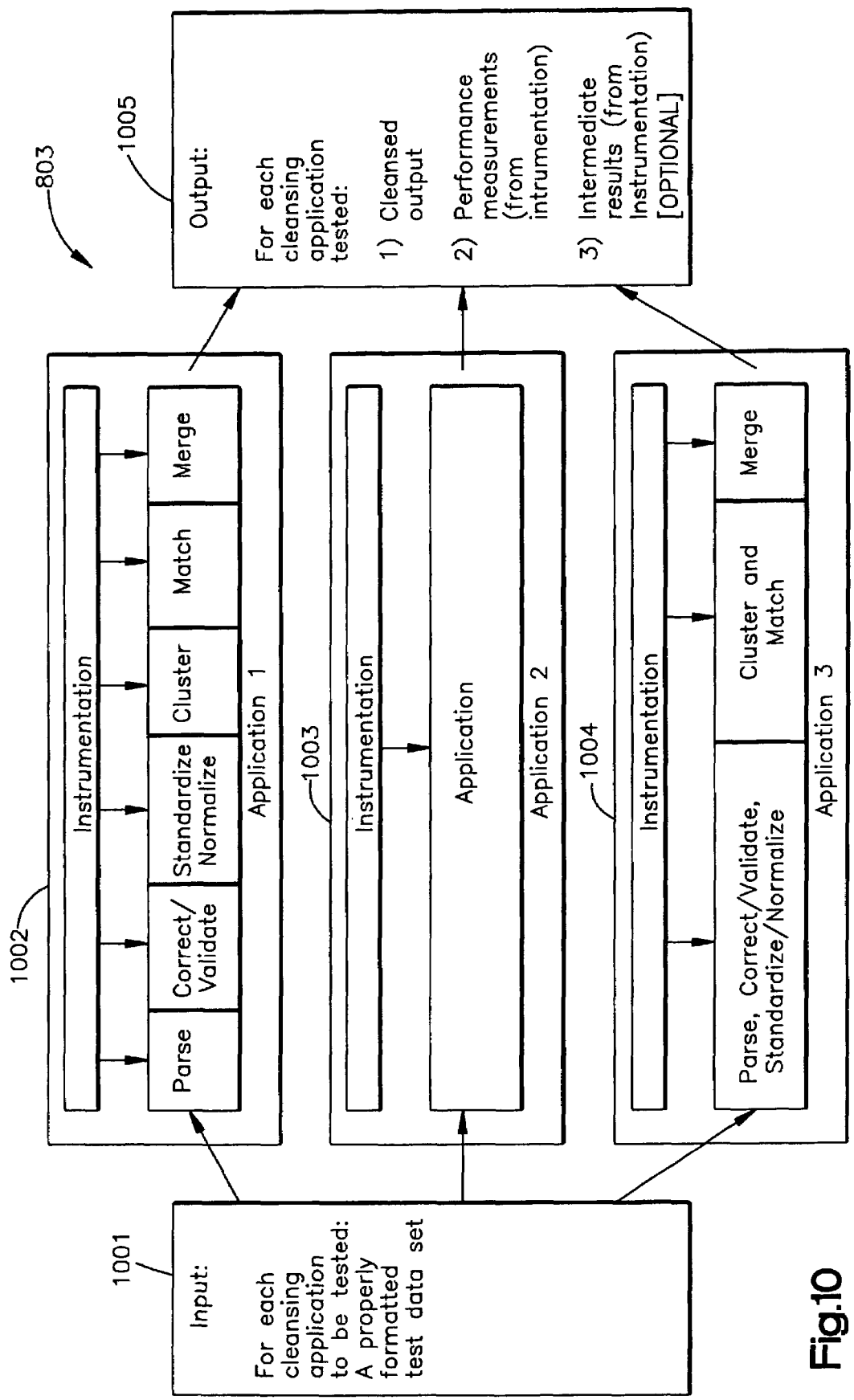
FIG. 10 is a schematic representation of still another part of an example system in accordance with the present invention.

The application execution module 803 executes the cleansing applications being evaluated (and associated components), as illustrated particularly in FIG. 10. The input 1001 to the module 803 is the formatted test cases for each application from the test generation module 902. The applications being evaluated may be executed in parallel, as shown in FIG. 10. Each application is instrumented (see 1002, 1003, 1004) to increase visibility into its execution beyond just the output results 1005 after the application finishes its cleansing. Examples of measurements that may be taken include execution time, RAM used, and extra disk space utilized. Results of intermediate steps may also be recorded, if evaluation of individual components of a particular cleansing application is desired.

The system 800 may also support applications being separated into components (if such separation is possible). In FIG. 10, there are three applications 1002, 1003, 1004 being evaluated. Applications 1002 and 1004 are separated into six and three components, respectively. Application 1003 is one component. Generally, cleansing applications can be separated into more than one component, with each component performing one or more of the six main steps of a data cleansing process (as discussed above).

Figure 11:
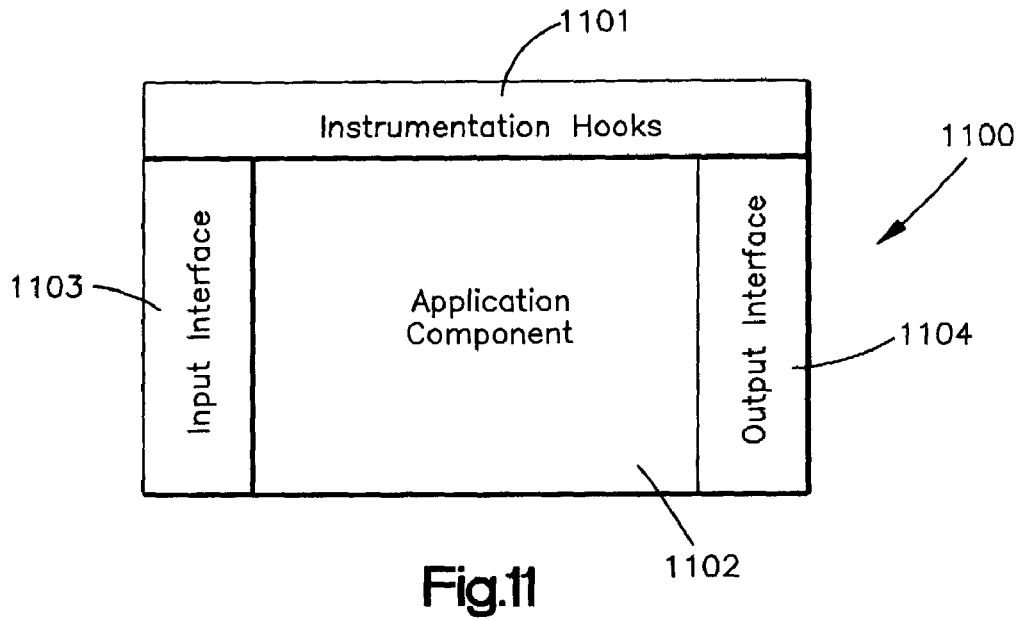
FIG. 11 is a schematic representation of yet another part of an example system in accordance with the present invention.

Each cleansing application component may be "wrapped", or have interfaces placed around it. One example set of interfaces 1103, 1104 that implement this "wrapping" is shown in FIG. 11. The "wrapper" 1100 provides instrumentation hooks 1101 into an example component 1102 and supports reformatting of input (in interface 1103) and output (in interface 1104) of the component 1102. Using "wrappers" in this manner may allow components from multiple cleansing applications to be combined together to create a new, more efficient "hybrid" cleansing application.

Figure 12:
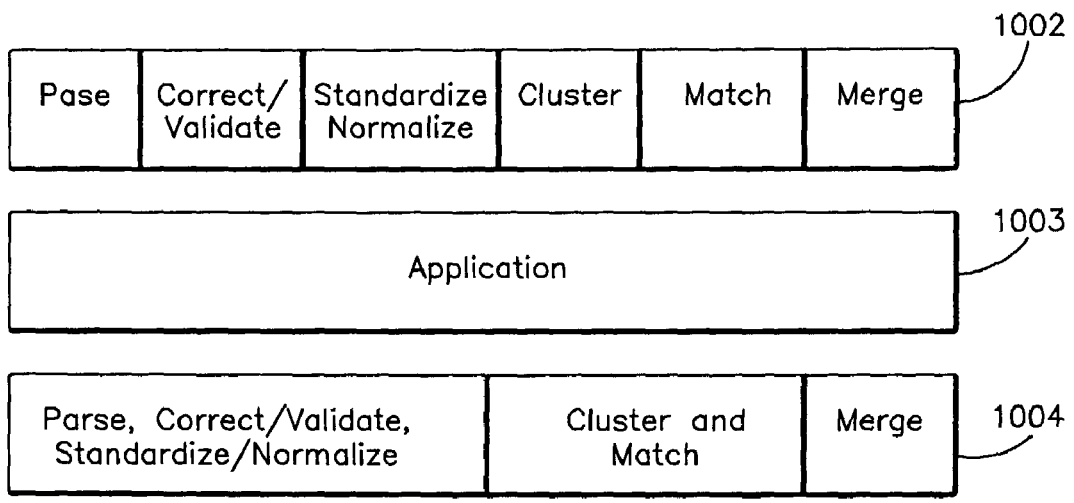
FIG. 12 is a schematic representation of still another part of an example system in accordance with the present invention.
Figure 13:
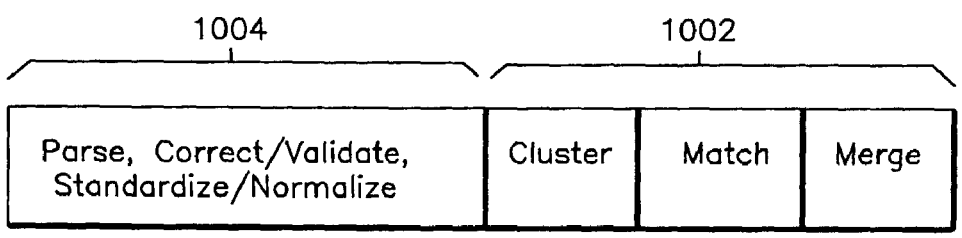
FIG. 13 is a schematic representation of yet another part of an example system in accordance with the present invention.

An example of this "hybrid" application is illustrated in FIGS. 12 and 13. FIG. 12 shows the three sample cleansing applications 1002, 1003, 1004. FIG. 13 shows a "hybrid" application that was created by putting together components from applications 1002 and 1004; the clustering/matching/merging components are from application 1002 and the rest is from application 1004. This capability may be used to evaluate and create "best of breed" solutions by combining the best components from several data cleansing applications.

The output 1005 of the application execution module 803 for each application tested is the cleansed result of the application, the performance measurements of the application (i.e., execution time, amount of memory used by the application, etc.), and optionally the results from intermediate steps (i.e., derived from the instrumentation 1100 of the application and included as needed for possible evaluation of individual components of the application).

The results reporting module 804 generates an evaluation report for each cleansing application. All reports have a common format, making it easier to compare results for different applications against each other. FIG. 14 shows the components of this module 804 in detail. The input 1401 to this module 804 may includes the "original" correct answer (i.e., what was given to the test data generator 902) and, for each application being evaluated, the final cleansed result (output from the application), the performance measurements, and optionally the results from intermediate steps from the instrumentation 1100 (only those used for evaluating the application or its components).

The cleansed results 1401 from each application are passed to the output standardizing component 1402, 1403, or 1404 associated with that application. The output standardizing component 1402, 1403, or 1404 puts cleansed results from the associated application into a common format, abstracting this lower level task from a statistics taking component 1406 and an application scoring component 1405.

The application scoring component 1405 provides quantitative measurements (or "scores") relating to how well each application cleansed the test data. The application scoring component 1405 compares the output from a cleansing application to the "original" clean data to generate a "correctness" score for each application. This score is based on how many errors from the dirty test set were detected and corrected. From the data about resource usage obtained by the system during its execution, a "resource usage" score also may be generated. Examples of factors that can be included in these scores and sample formula to generate these scores are described below. If an application can be divided into individual components, a score may be assigned to each component.

The statistics taking component 1406 examines the final output result and performance measurements for each application and generates a set of relevant statistical measurements. There are numerous statistical measurements that may be taken.

The output 1407 of the results reporting module 804 is a report for each application that was evaluated. Each report includes a standardized and cleansed result (from the associated output standardizing component), statistics on results (including performance results) from the statistics components 1406, and an application score for correctness and resource usage from the scoring component 1405. (optionally, if the application could be divided into components, a score may be assigned to each component within each application).

The correctness and resource usage scores assigned to the applications by the application scoring component 1405 quantify how well the application cleansed the data. There are numerous possible ways to compute these scores. The following are examples of factors that may be used and formulas for combining them together. Note that these examples should in no way be considered an exclusive or exhaustive list. These examples are for illustrative purposes only.

Intuitively, a quality score may capture "how close" the application output matches the known correct answer. What it means to be "close" to the correct answer depends on the application for which the data is being cleansed. Based on the type of data and how the data is being used, some types of errors left in the cleansed result are more acceptable than others, and this should be reflected in an assigned score.

For example, if the data represents a customer mailing list, the user would consider throwing out unique customers records a worse error than leaving several records describing the same customer in the mailing list. The latter may be annoying (i.e., multiple mailings to same person), but the former may result in a lost customer. For this example, there are many possible ways to classify the errors in the database. One very simple way of looking at the errors is to divide them into three possible types: unique records are incorrectly thrown out (e.g., throw out all records referring to a customer from a mailing list); duplicate records are incorrectly left in the cleansed result (e.g., leaving multiple records referring to the same customer in the mailing list); and records are not parsed/corrected/standardized correctly (e.g., record referring to the customer has an invalid address).

FIG. 15 is an example formula combining the frequency of these three different errors types together. Higher scores indicate the application result is closer to the correct answer (i.e., "more correct") and the score computed is always between 0 and 1. These two properties allow correctness scores for different test data sets from different data cleansing applications to be compared to each other. The terms in FIG. 15 are now defined below.

The terms w1, w2, w3 are the weights that control relative impact of each term on the final score. Higher value for the weight means the term has more impact on the final score. The weights may be assigned by the user or automatically by the system, depending on the application.

The term total_records is the total number of records in a dirty test set. The term orig_uniques is the number of unique records in a dirty test set (also number of records in a clean set used to generate a dirty set). The term orig_duplicates is the number of duplicate records added by the data generator to create a dirty test set.

actual_unique is the number of unique records left in a cleansed result. actual_duplicate is the number of duplicate records detected and thrown out by an application. records_correctly_PCSed is the number of records in a cleansed result properly parsed/corrected/standardized.

The resource usage score is meant to reflect how many resources an application uses to cleanse a particular data set. Users will have a limited number of resources, with some resources more constrained than others. For example, if the user has a tight deadline and needs an answer quickly, execution time may be the most important consideration.

A measurement of resource usage may consider this. For example, there are many possible different metrics regarding resource usage that can be measured and used to evaluate the application. Three example metrics are extra disk space used during execution, execution time, and memory usage by the application.

FIG. 16 shows an example formula combining these metrics. The score computed is always between 0 and 1. However, higher scores are now a negative indicator because more resources are being used. These two properties allow resource usage scores for different test data sets from different data cleansing applications to be compared to each other. The terms in FIG. 16 are defined below.

w4, w5, w6 are the weights that control relative impact of each term on the final score. Higher value for the weight means the term has more impact on the final score. The weights may be assigned by the user or automatically by the system.

disk_space_used is the disk space used to store extra structures used by an application to process a the dirty test set. MAX_DISK_SPACE is the largest possible disk space (should be a constant). execution_time is the number of duplicate records added by a data generator to create a dirty test set. MAX_EXECUTION_TIME is the largest possible execution time (should be a constant). memory_used is the amount of RAM memory used by an application to process the test data set. MAX_MEMORY_USED is the largest possible amount of RAM memory used (should be a constant).

An example of a formula that captures the trade-off between resource usage and correctness of the result is given in FIG. 17. The weights assigned to the terms should reflect a user's desired tradeoffs. For example, if resources are relatively unconstrained and correctness is most important, then the quality weight ($w_q$) should be higher than the correctness weight ($w_c$). Notice that the resource usage term is subtracted from the correctness term. This means that the overall score could be negative if the application misses many errors and uses a large number of resources in obtaining the result. If the correctness score (FIG. 15) and the resource usage score (FIG. 16) are utilized, then the overall score will also be normalized as well thereby allowing overall scores for different test data sets to be compared to each other.

From the above description of the invention, those skilled in the art will perceive improvements, changes and modifications. Such improvements, changes and modifications within the skill of the art are intended to be covered by the appended claims.

Having described the invention, the following is claimed:

1. A computer readable storage medium containing software for evaluating a first data cleansing application and a second data cleansing application, said software comprising:
    a test data generator for creating a dirty set of sample data from a clean set of data wherein said dirty set of sample data includes erroneous data that modifies said clean set of data;
    an application execution module for cleansing the dirty set of sample data, said application execution module utilizing the first data cleansing application to identify similarities between fields in alpha numeric text records of the dirty set of sample data and create a first cleansed output, said application execution module further utilizing the second data cleansing application to identify similarities between fields in alpha numeric text records of the dirty set of sample data and create a second cleansed output; and
    a results reporting module for evaluating the first and second cleansed outputs, wherein the first and second cleansed outputs differ from each other in value, said results reporting module producing an output of scores and statistics for each of the first cleansed output of the first data cleansing application and the second cleansed output of the second data cleansing application, said output being stored in said storage medium and wherein said results reporting module further outputs data regarding intermediate steps conducted by the first and second data cleansing applications.

2. The computer readable storage medium as set forth in claim 1 wherein said test data generator is part of a test data generation module, said test generation module formatting the dirty set of sample data subsequent to the creation of the dirty set of sample data.

3. The computer readable storage medium as set forth in claim 1 wherein said results reporting module evaluates the performance of the intermediate steps of the first and second data cleansing applications to produce a hybrid data cleansing application comprising steps from each of the first and second data cleansing applications.

4. The computer readable storage medium as set forth in claim 1 wherein said system evaluates the first and second data cleansing applications based on execution time, memory utilized, and disk space utilized.

5. The computer readable storage medium as set forth in claim 1 wherein said system produces a first correctness score for the first data cleansing application and a second correctness score for the second data cleansing application, the first and second correctness scores being standardized such that the first correctness score may be compared to the second correctness score to determine the more accurate data cleansing application.

6. The computer readable storage medium as set forth in claim 5 wherein said system produces a first resource usage score for the first data cleansing application and a second resource usage score for the second data cleansing application, the first and second resource usage scores being compared to determine the more efficient data cleansing application.

7. The computer readable storage medium as set forth in claim 6 wherein said system produces an overall score for the first data cleansing application combining the first correctness score and the first resource usage score.

8. The computer readable storage medium as set forth in claim 1 wherein said application execution module comprises instrumentation for providing visibility of results of intermediate steps within the first data cleansing application and the second data cleansing application.

9. The computer readable storage medium as set forth in claim 1 wherein said results reporting module further produces an output of cleansed results in a standardized format from the first data cleansing application and the second data cleansing application.

10. The computer readable storage medium as set forth in claim 1 wherein the first cleansed output comprises a first correctness score, the second cleansed output comprises a second correctness score, and said results reporting module compares the first and second correctness scores.

11. The computer readable storage medium as set forth in claim 1 wherein the first data cleansing application executes at least one step from a group consisting of parsing, validating, correcting, standardizing, matching, and merging.

12. A computer-implemented method for comparing a first data cleansing application to a second data cleansing application, said method comprising the steps of:
    creating a dirty set of sample data from a clean set of data, wherein said dirty set of sample data includes erroneous data that modifies said clean set of data;
    cleansing the dirty set of sample data by utilizing the first data cleansing application to identify similarities between fields in alpha numeric text records of the dirty set of sample data and create a first cleansed output;
    cleansing the dirty set of sample data by utilizing the second data cleansing application to identify similarities between fields in alpha numeric text records of the dirty set of sample data and create a second cleansed output;
    comparing the first and second cleansed outputs, wherein the first and second cleansed outputs differ from each other in value, the first and second cleansed outputs both comprising scores and statistics for each of the first and second data cleansing applications; and
    storing the first and second cleansed output in a storage medium; and outputting data regarding intermediate steps conducted by the first and second data cleansing applications.

13. The method as set forth in claim 12 further including a step of formatting the dirty set of sample data for the first data cleansing application and formatting the dirty set of sample data for the second data cleansing application.

14. The method as set forth in claim 12 further including a step of taking most accurate intermediate steps from each of the first and second data cleansing applications and combining the most accurate intermediate steps into a hybrid data cleansing application.

15. The method as set forth in claim 12 further including a step of wrapping a component of the first data cleansing application to allow the component to be combined with a component from the second data cleansing application.

16. The method as set forth in claim 12 further including a step of generating an evaluation report for the first data cleansing application and the second data cleansing application.

17. The method as set forth in claim 12 further including a step of identifying groups of the alpha numeric text records from the first and second cleansed outputs that have similar correctness values.

\* \* \* \* \*